United States Patent
Stout et al.

(10) Patent No.: US 10,505,628 B2
(45) Date of Patent: Dec. 10, 2019

(54) DESIGNATED MAP LUMINAIRES

(71) Applicants: Barry Stout, Beverly, MA (US); Henry Feil, Unterhaching (DE)

(72) Inventors: Barry Stout, Beverly, MA (US); Henry Feil, Unterhaching (DE)

(73) Assignee: OSRAM SYLVNAIA Inc., Wilmington, MA (US)

( * ) Notice: Subject to any disclaimer, the term of this patent is extended or adjusted under 35 U.S.C. 154(b) by 0 days.

(21) Appl. No.: 15/719,711

(22) Filed: Sep. 29, 2017

(65) Prior Publication Data
US 2019/0103915 A1    Apr. 4, 2019

(51) Int. Cl.
*H04B 10/116* (2013.01)
*H04N 5/225* (2006.01)
*G01C 21/20* (2006.01)
*H04N 5/235* (2006.01)
*H04W 4/02* (2018.01)
*H05B 37/02* (2006.01)
*H04B 10/114* (2013.01)

(52) U.S. Cl.
CPC ......... *H04B 10/116* (2013.01); *G01C 21/206* (2013.01); *H04N 5/2256* (2013.01); *H04N 5/2353* (2013.01); *H04B 10/114* (2013.01); *H04W 4/026* (2013.01); *H05B 37/0209* (2013.01)

(58) Field of Classification Search
None
See application file for complete search history.

(56) References Cited

U.S. PATENT DOCUMENTS

| | | | | |
|---|---|---|---|---|
| 5,477,550 A | * | 12/1995 | Crisler | H04L 1/1809 714/748 |
| 5,917,634 A | * | 6/1999 | Otobe | G02B 6/4204 250/574 |
| 7,970,537 B2 | * | 6/2011 | Ann | G01C 21/20 398/172 |
| 8,230,288 B2 | * | 7/2012 | Kwon | H04L 47/10 714/748 |

(Continued)

OTHER PUBLICATIONS

Janssen, Cory, Automatic Repeat reQuest (ARQ), 2015 (Year: 2015).*

(Continued)

*Primary Examiner* — Kenneth N Vanderpuye
*Assistant Examiner* — Jai M Lee
(74) *Attorney, Agent, or Firm* — Yutian Ling

(57) ABSTRACT

Various implementations disclosed herein include a method of providing indoor navigation services. The method may include transmitting, via light-based communication (LCom) signals by each of a first plurality of luminaires, identifiers assigned to each of the plurality of luminaires, and transmitting, via LCom signals by a second plurality of luminaires, mapping information associating the identifiers of each of the first plurality of luminaires with a location of each of the first plurality of luminaires. The first plurality of luminaires may transmit the LCom signals towards the ground of an indoor environment while the second plurality of luminaires may transmit the LCom signals towards the ceiling of the indoor environment and are reflected downwards.

11 Claims, 9 Drawing Sheets

(56) References Cited

U.S. PATENT DOCUMENTS

| | | | | |
|---|---|---|---|---|
| 8,620,163 | B1* | 12/2013 | Sleator | H04B 10/116 348/116 |
| 9,952,305 | B2* | 4/2018 | Ganick | G01S 1/70 |
| 9,997,070 | B1* | 6/2018 | Komanduri | G08G 1/142 |
| 10,054,665 | B2* | 8/2018 | Feil | G01S 1/70 |
| 10,218,440 | B2* | 2/2019 | Cha | G06K 9/20 |
| 2009/0052902 | A1* | 2/2009 | Shinokura | H04B 10/1143 398/118 |
| 2009/0157309 | A1* | 6/2009 | Won | G01C 21/20 701/533 |
| 2009/0180780 | A1* | 7/2009 | Ann | H04B 10/1149 398/128 |
| 2010/0209105 | A1* | 8/2010 | Shin | H04B 10/1149 398/58 |
| 2011/0153201 | A1* | 6/2011 | Park | G01C 21/20 701/533 |
| 2012/0170939 | A1* | 7/2012 | Schenk | H05B 33/0863 398/106 |
| 2014/0270791 | A1* | 9/2014 | Hyde | H04B 10/116 398/118 |
| 2015/0098709 | A1* | 4/2015 | Breuer | G01C 3/08 398/118 |
| 2015/0147070 | A1* | 5/2015 | Oshima | H04B 10/116 398/202 |
| 2015/0280820 | A1* | 10/2015 | Breuer | H04B 10/116 398/128 |
| 2015/0282282 | A1* | 10/2015 | Breuer | H05B 37/0272 315/152 |
| 2015/0373503 | A1* | 12/2015 | Jovicic | G01S 5/0252 455/456.1 |
| 2016/0036526 | A1* | 2/2016 | Parello | H04B 10/116 398/127 |
| 2016/0323035 | A1* | 11/2016 | Jovicic | H04B 10/0795 |
| 2018/0269969 | A1* | 9/2018 | Lee | H04B 10/116 |
| 2018/0376570 | A1* | 12/2018 | Verbrugh | H05B 37/0245 |

OTHER PUBLICATIONS

Leballe, Robert, Global-Shutter vs. Rolling-Shutter Readouts, 2014 (Year: 2014).*

Kuo et al., Luxapose: Indoor Positioning with Mobile Phones and Visible Light, 2014 (Year: 2014).*

* cited by examiner

DESIGNATED MAP LUMINAIRES

FIELD OF THE DISCLOSURE

This disclosure relates to light-based communication (LCom), and more specifically to luminaires that transmit mapping information via LCom signals.

BACKGROUND

Indoor navigation systems commonly use physical signs and/or radio-frequency (RF) signals to facilitate navigation of buildings or structures. Physical signs may be located throughout a building, such that users can observe each sign along a path to a desired location within the building. RF based navigation systems involve communication signals, such as Wi-Fi signals, for exchanging navigation information with one or more users of the system. These systems often include several RF transmitters (e.g., a BLUETOOTH® Beacon) configured to communicate with users located in or about a building. To ensure sufficient access to the system, these transmitters may be positioned throughout the building.

SUMMARY

Various implementations disclosed herein provides a method of providing indoor navigation services. The method may include transmitting, via light-based communication (LCom) signals by each of a first plurality of luminaires, identifiers assigned to each of the plurality of luminaires, and transmitting, via LCom signals by a second plurality of luminaires, mapping information associating the identifiers of each of the first plurality of luminaires with a location of each of the first plurality of luminaires.

In some embodiments, a computing device receives the identifiers of one or more of the first plurality of luminaires and the mapping information and is configured to determine a location of the computing device based on the received identifiers and the mapping information. In some embodiments, the first plurality of luminaires transmits the LCom signals towards the ground of an indoor environment, and the second plurality of luminaires transmits the LCom signals towards the ceiling of the indoor environment. In some embodiments, a computing device directly receives the LCom signals from the first plurality of luminaires, and indirectly receives the LCom signals from the second plurality of luminaires via reflection from the ceiling of the indoor environment. In some embodiments, the first plurality of luminaires transmits the identifiers at a first data rate and the second plurality of luminaires transmits the mapping information at a second data rate slower than the first data rate. In some embodiments, the mapping information is divided into a plurality of portions of mapping information, and transmitting the mapping information includes transmitting each of the plurality of portions of mapping information a predetermined number of times. In some embodiments, a first subset of the second plurality of luminaires transmits general mapping information and a second subset of the second plurality of luminaires transmits detailed mapping information.

Additional implementations disclosed herein provides a method of receiving indoor navigation services. The method may include capturing, at a computing device, an image comprising light emitted by a plurality of luminaires, in which a first luminaire in the plurality of luminaires transmits a first identifier encoded in a first light-based communication (LCom) signal and a second luminaire in the plurality of luminaires transmits mapping information encoded in a second LCom signal, the mapping information associating the first identifier with a location of the first luminaire, defining, by the computing device, a first portion of the image that includes light emitted by first luminaire, decoding, by the computing device, the first LCom signal from the first portion of the image to obtain the first identifier, subtracting, by the computing device, the first LCom signal from the image to obtain the second LCom signal, decoding, by the computing device, the second LCom signal to obtain the mapping information, and determining, by the computing device, a location of the computing device based on the first identifier and the mapping information.

In some embodiments, the first luminaire transmits the first identifier at a first data rate and the second luminaire transmits the mapping information at a second data rate slower than the first data rate. In some embodiments, the image includes light emitted directly from the first luminaire and light emitted by the second luminaire and reflected from a surface. In some embodiments, capturing the image of light emitted by the first luminaire and the second luminaire includes setting, by the computing device, a first shutter speed for raster lines of the image that capture light emitted by the first luminaire and the second luminaire, and setting, by the computing device, a second shutter speed for raster lines of the image that capture light emitted by the second luminaire, wherein the second shutter speed is slower than the first shutter speed. In some embodiments, the image further includes light emitted by a third luminaire in the plurality of luminaires that transmits a third identifier encoded in a third LCom signal, the method further includes defining, by the computing device, a second portion of the image that includes light emitted by third luminaire, decoding, by the computing device, the third LCom signal from the second portion of the image to obtain the third identifier, subtracting, by the computing device, the first LCom signal and the third LCom signal from the image to obtain the second LCom signal, and determining, by the computing device, the location of the computing device based on the first identifier, the third identifier, and the mapping information.

Additional implementations disclosed herein provides an indoor navigation system that includes a first plurality of luminaires, in which each of the first plurality of luminaires is configured to transmit an associated identifier via light-based communication (LCom) signals, a second plurality of luminaires, in which each of the second plurality of luminaires is configured to transmit mapping information via LCom signals, the mapping information associating the identifiers of each of the first plurality of luminaires with a location of each of the first plurality of luminaires, and a computing device configured to determine a location of the computing device based on the LCom signals transmitted by the first plurality of luminaires and the LCom signals transmitted by the second plurality of luminaires.

In some embodiments, the computing device is configured to determine the location of the computing device by capturing an image comprising a first LCom signal emitted by a first luminaire in the first plurality of luminaires and a second LCom signal emitted by a second luminaire in the second plurality of luminaires, defining a first portion of the image that includes light emitted by first luminaire, decoding the first LCom signal from the first portion of the image to obtain a first identifier of the first luminaire, subtracting the first LCom signal from the image to obtain the second LCom signal, decoding the second LCom signal to obtain the mapping information, and determining, by the computing device, a location of the computing device based on the first identifier and the mapping information. In some embodiments, the first plurality of luminaires transmits the identifiers at a first data rate and the second plurality of luminaires transmits the mapping information at a second data rate slower than the first data rate. In some embodiments, the first plurality of luminaires transmits the LCom signals towards the ground of an indoor environment, and the second plurality of luminaires transmits the LCom signals towards the ceiling of the indoor environment. In some embodiments, the computing device directly receives the LCom signals from the first plurality of luminaires, and indirectly receives the LCom signals from the second plurality of luminaires via reflection from the ceiling of the indoor environment. In some embodiments, the computing device receives the LCom signals transmitted by the first plurality of luminaires via a first image capture device or sensor, and receives the LCom signals transmitted by the second plurality of luminaires via a second image capture device or sensor. In some embodiments, a first subset of the second plurality of luminaires transmits general mapping information and a second subset of the second plurality of luminaires transmits detailed mapping information. In some embodiments, the mapping information is divided into a plurality of portions of mapping information and the second plurality of luminaires is configured to transmit each of the plurality of portions of mapping information a predetermined number of times.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
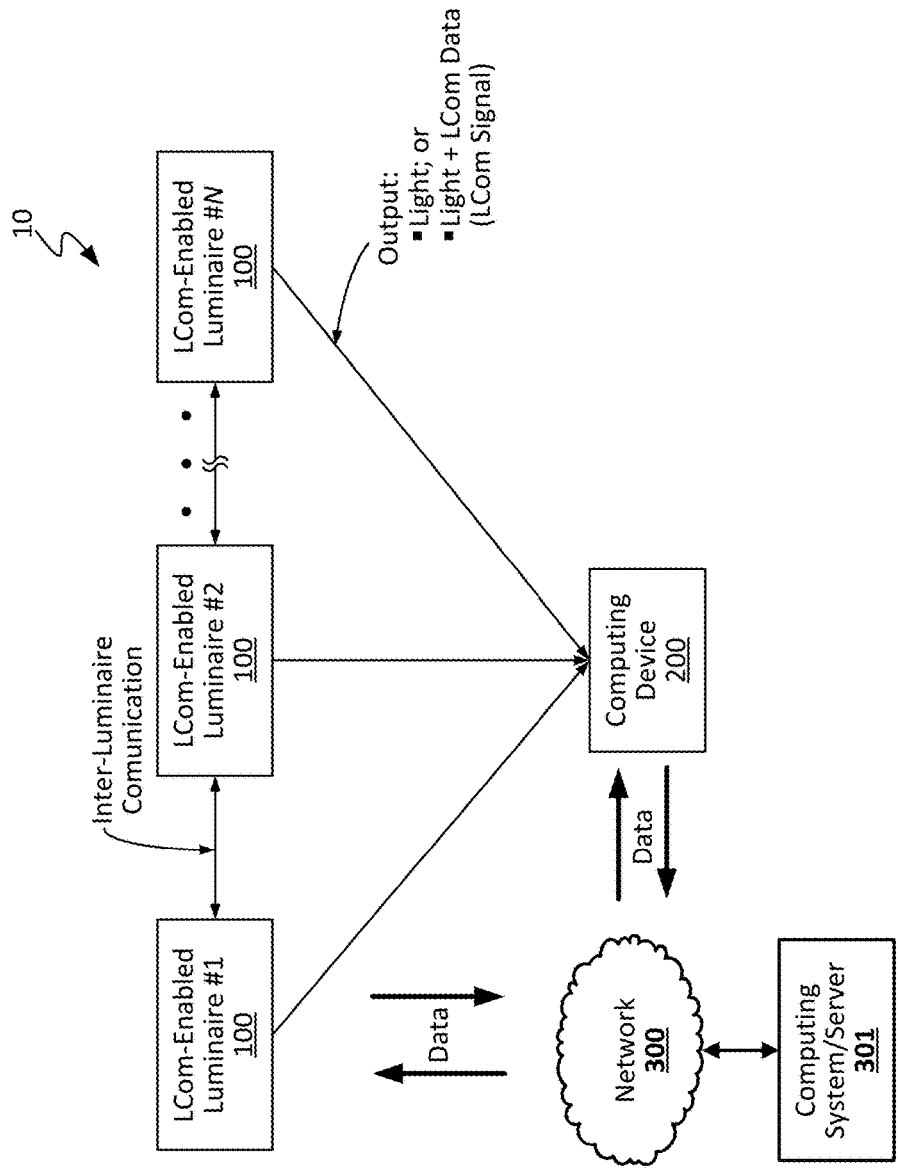
FIG. 1 is a block diagram illustrating an example LCom system configured in accordance with embodiments of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architecture are disclosed for transmitting identifier and mapping information in an LCom system, such as an indoor navigation system. A first plurality of luminaires may be configured to each transmit a unique identifier via LCom signals. A second plurality of luminaires may be configured to transmit mapping information via LCom signals. The mapping information associates the identifiers of the first plurality of luminaires with locations in an indoor environment. The light of the first plurality of luminaires may be aimed downward towards the floor, while the light of the second plurality of luminaires may be aimed upward towards the ceiling and reflected off the ceiling. Thus the light encoding the mapping information may be ambient light in the indoor environment. A computing device may capture the LCom signals received from at least one of the first plurality of luminaires and at least one of the second plurality of luminaires. The computing device may decode the identifier and mapping information in order to determine the location of the computing device. Numerous lighting applications and embodiments will be apparent in light of this disclosure.

General Overview

Light-based communication ("LCom") systems for indoor navigation provide enhanced precision and accuracy over other technologies, such as GPS or Wi-Fi. LCom systems include luminaires configured to transmit light encoded with information, such as an identifier associated with each luminaire. A computing device (e.g., a smart phone) may receive the LCom signal via sensors (such as a camera or ambient light sensor) and decode the information. A navigation application executing on the computing device may store and/or retrieve mapping information linking luminaire identifiers to physical locations. Based on this information, the navigation application may determine the location of the computing device within the indoor environment.

However, many mobile computing devices were not designed for receiving LCom signals, so data collection may limited by the frame rates of the CMOS cameras on the computing devices. Typical frame rates for cameras on mobile computing devices may range from 30-60 frames per second (fps), so the rate of collecting LCo signals may not increase significantly.

Identifiers typically are 10-16 bits long and are captured in 1-3 frames of video. The mapping information is usually sent through another means that allows for a longer stream of information, such as 1 Kbyte. While the mapping information does repeat, the data stream for capturing the complete mapping information may span hundreds of video frames. The mapping information may be transmitted using RF technologies such as Wi-Fi. However, Wi-Fi may not be available in all indoor environments, or RF transmission may be restricted in certain areas (e.g., hospitals). In addition, there may be security issues with transmitting mapping information over Wi-Fi. For example, hackers may gather the mapping information remotely and design their own navigation system. Therefore, in some cases it may be preferable to transmit the mapping information using non-RF methods.

Thus, and in accordance with an embodiment of the present disclosure, techniques and architecture are disclosed for an LCom system that transmits both identifiers and mapping information via LCom signals. The LCom system may include a first plurality of luminaires and a second plurality of luminaires. Each of the first plurality of luminaires may be configured to transmit a unique identifier via LCom signals. Each of the second plurality of luminaires may be configured to transmit mapping information via LCom signals. The mapping information may associate the identifiers of the first plurality of luminaires with their respective location in an indoor environment. The first plurality of luminaires may be pointed downward to illuminate the floor of the indoor environments. The second plurality of luminaires may be pointed upwards towards the ceiling, and the light emitted by the second plurality of luminaires may be reflected off the ceiling. Thus the first plurality of luminaires may provide direct downward lighting while the second plurality of luminaires may provide indirect ambient lighting.

A computing device (e.g., a smart phone) may have an image capture device (e.g., camera) or a sensor (e.g., ambient light sensor) that captures an image of the light emitted by at least one of the first plurality of luminaires and at least one of the second plurality of luminaires. A navigation application executing on the computing device may be configured to decode the LCom signals from the image to determine the location of the computing device. For example, the navigation application may define or isolate portions of the image that contains light emitted by the first plurality of luminaires and decode the LCom signals from those portions to obtain the transmitted identifiers. The navigation application may then subtract the LCom signals from the first plurality of luminaires from the image to obtain the LCom signals transmitted by the second plurality of luminaires. The navigation application may obtain the mapping information from those LCom signals, and then use the identifiers and the mapping information to determine the location of the computing device. In this manner, there is no need for a separate communication system (e.g., WiFi) to provide the mapping information. All the information may be provided via LCom signals in the indoor environment. It also makes it more difficult for hackers to obtain the mapping information remotely.

System Architecture and Operation

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in a bi-directional fashion between a given LCom-enabled luminaire 100 and a computing device 200, where both act as a transceiver device capable of transmitting and receiving.

In some cases in which system 10 includes a plurality of LCom-enabled luminaires 100, all (or some sub-set thereof) may be configured for communicative coupling with one another so as to provide inter-luminaire communication. In one such scenario, for instance, the inter-luminaire communication can be used to notify other luminaries 100 that a given computing device 200 is currently present, as well as the position information for that particular computing device 200. Such inter-luminaire communication is not needed, however, as will be appreciated in light of this disclosure.

As can be further seen in this example embodiment, system 10 allows for communicative coupling with a network 300 and one or more servers or other computer systems 301. Communicative coupling may be provided, for example, between network 300 and computing device 200 and/or one or more LCom-enabled luminaires 100, as desired. The network 300 may be a wireless local area network, a wired local network, or a combination of local wired and wireless networks, and may further include access to a wide area network such as the Internet or a campus-wide network. In short, network 300 can be any communications network.

The computer systems 301 may be any suitable computing system capable of communicating over a network 300, such as a cloud-based server computer, and may be programmed or otherwise configured to provide an LCom related service, according to some embodiments. For example, an LCom related service might be that the computer system 301 is configured to provide storage of mobile computing device position information or the position information of the luminaires 100. Numerous other such configurations will be apparent in light of this disclosure.

Figure 2A:
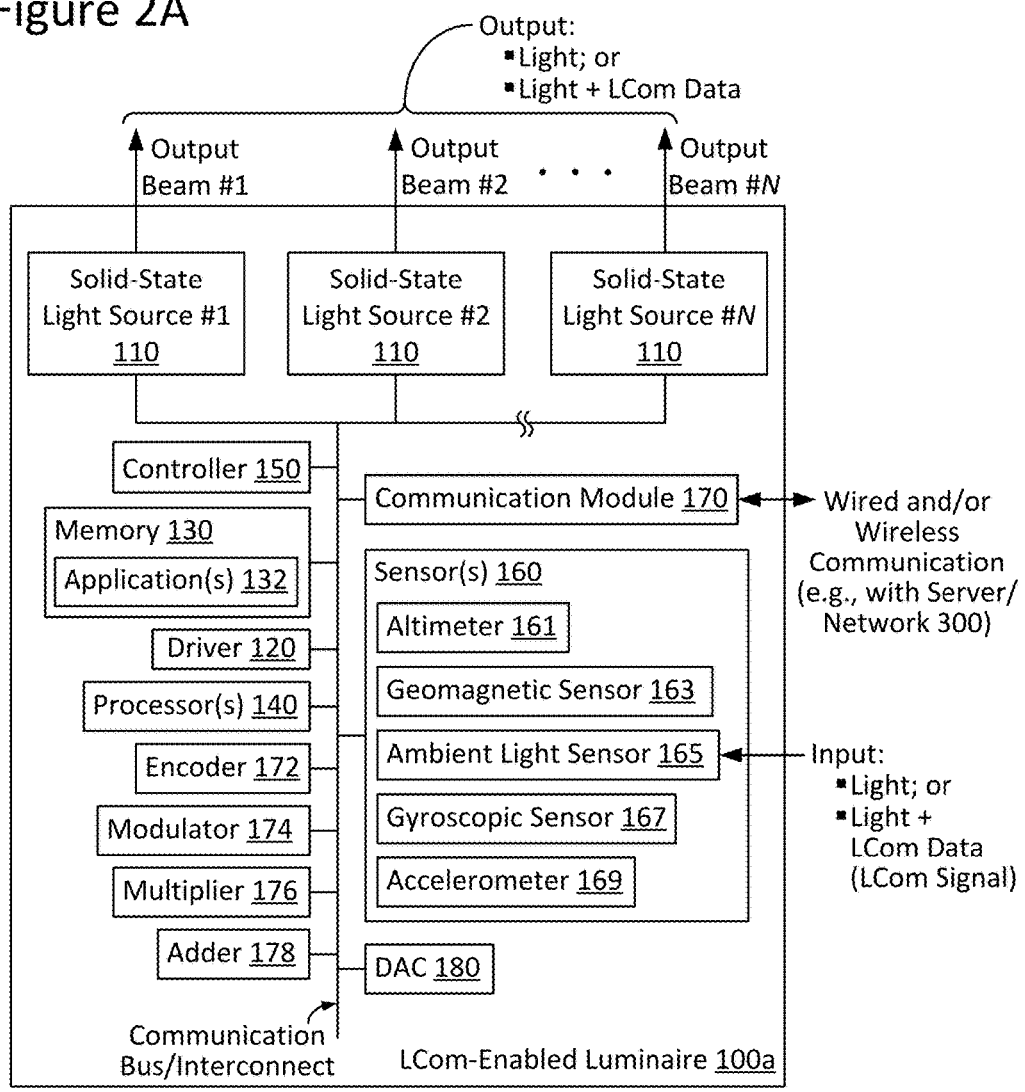
FIG. 2A is a block diagram illustrating an LCom-enabled luminaire configured in accordance with embodiments of the present disclosure.
Figure 2B:
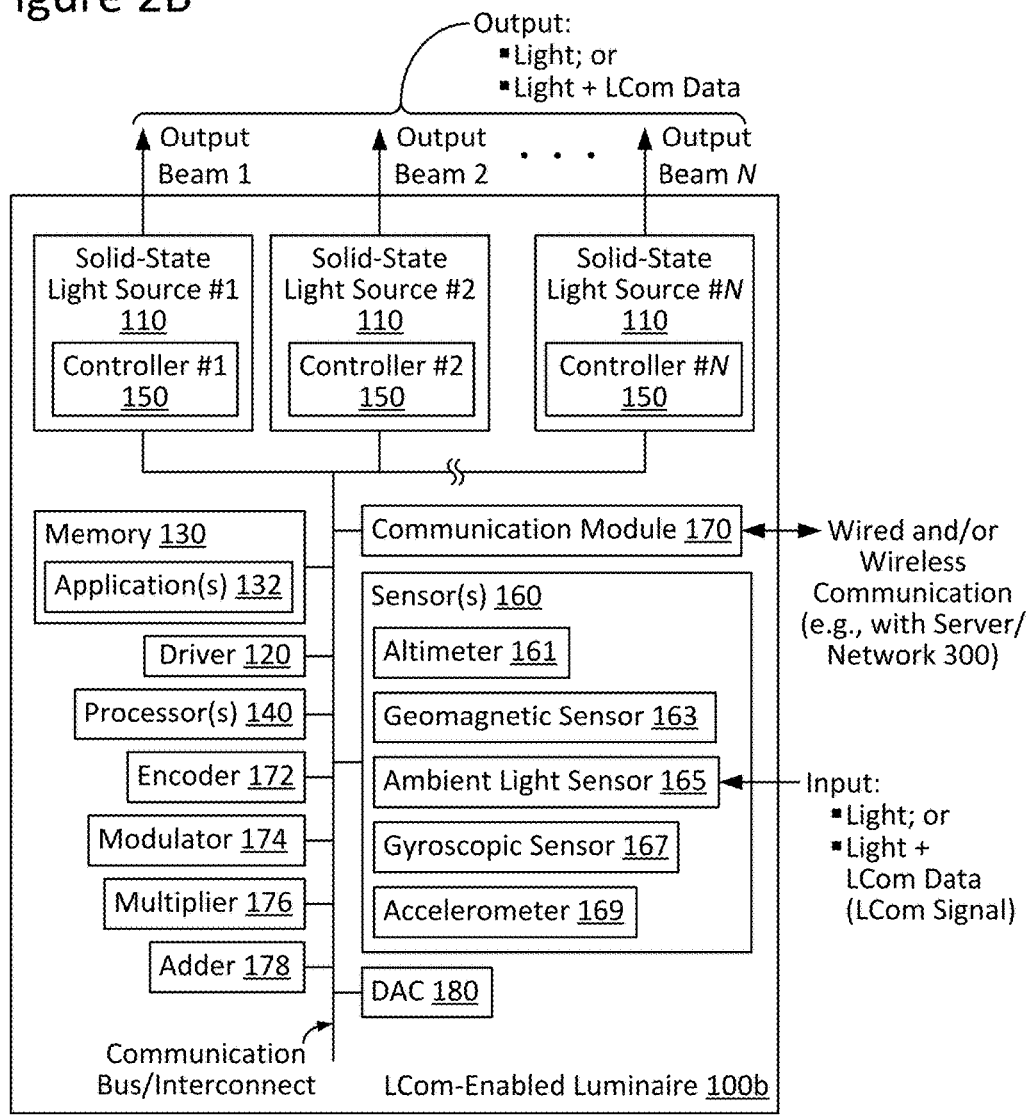
FIG. 2B is a block diagram illustrating an LCom-enabled luminaire configured in accordance with embodiments of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. As can be seen, a difference between luminaire 100a and luminaire 100b is with respect to the location of controller 150. For consistency and ease of understanding of the present disclosure, LCom-enabled luminaires 100a and 100b hereinafter may be collectively referred to generally as an LCom-enabled luminaire 100, except where separately referenced. Further note that while various modules are shown as distinct modules for purposes of illustration, any number of the modules may be integrated with one or more other modules. For instance, the controller 150 may be integrated with the driver 120. Similarly, the processor(s) 140 and memory 130 may be integrated within the controller 150. Numerous other configurations can be used.

With respect to FIGS. 2A-2B, a given solid-state light source 110 may include one or more solid-state emitters, which may be any of a wide range of semiconductor light source devices, such as, for example, a light-emitting diode (LED), an organic light-emitting diode (OLED), a polymer light-emitting diode (PLED), or a combination of any of these. A given solid-state emitter may be configured to emit electromagnetic radiation, for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In other embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate. In some cases, power and/or control connections for a given solid-state emitter may be routed from a given PCB to a driver 120 (discussed in turn below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted there through. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters) in order to transmit a LCom signal. To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be further seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the applications 132 thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis. In one example embodiment, the memory 130 may store one or more identifiers, or may store mapping information, that the luminaire 100 may transmit via LCom signals.

The one or more applications 132 stored in memory 130 can be accessed and executed, for example, by the one or more processors 140 of a given LCom-enabled luminaire 100. In accordance with some embodiments, a given application 132 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 132 can be instructions encoded on any suitable non-transitory machine-readable medium that, when executed by one or more processors 140, carries out functionality of a given LCom-enabled luminaire 100, in part or in whole.

In accordance with some embodiments, the one or more solid-state light sources 110 of a given LCom-enabled luminaire 100 can be electronically controlled, for example, to output light and light encoded with LCom data (e.g., an LCom signal). To that end, a given LCom-enabled luminaire 100 may include or otherwise be communicatively coupled with one or more controllers 150. In some such example embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface or network 300). As a result, a given LCom-enabled luminaire 100 may be controlled in such a manner as to output any number of output beams (1-N), which may include light in the form of LCom data, as desired for a given target application or end-use. However, the present disclosure is not so limited.

For example, in some other embodiments, such as that illustrated in FIG. 2B, a controller 150 may be packaged or otherwise hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional network 300, etc.). As a result, LCom-enabled luminaire 100 may be controlled in such a manner as to output any number of output beams (1-N), which may include light in the form of LCom data, as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110 to communicate luminaire position via an identifier or mapping information. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of LCom signals for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing there through, as desired. Other suitable configurations for multiplier 176 will depend on a given application and will be apparent in light of this disclosure. In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing there through, as desired.

Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Note that DAC 180 may further be integrated into controller 150, in some embodiments. Other suitable configurations will be apparent in light of this disclosure.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided as desired for a given target application or end-use, in accordance with some other embodiments, or no sensors 160 may be provided, as the case may be. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be a transceiver or other network interface circuit configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. In addition or alternatively, communication module 170 may be configured so as to allow for receipt of information from network 300, such as luminaire position or estimated mobile computing device position information. As explained herein, the estimated mobile computing device position information associated with the computing device 200 can be used by the luminaire to compute luminaire position. Whether the estimated mobile computing device position is computed in real time at the luminaire or received from somewhere else, the estimated mobile computing device position information can then be used to generate the LCom signals emitted by that luminaire 100 to communicate luminaire position to passing computing devices 200. The communication module 170 may be configured to use any suitable wired and/or wireless transmission technologies (e.g., radio frequency, or RF, transmission; infrared, or IR, light modulation; etc.), as desired for a given target application or end-use. These transmission technologies may be implemented with a transceiver, for example a Bluetooth Beacon, integrated with or connected to the communications module 170. Other suitable configurations for communication module 170 will depend on a given application and will be apparent in light of this disclosure.

Figure 3:
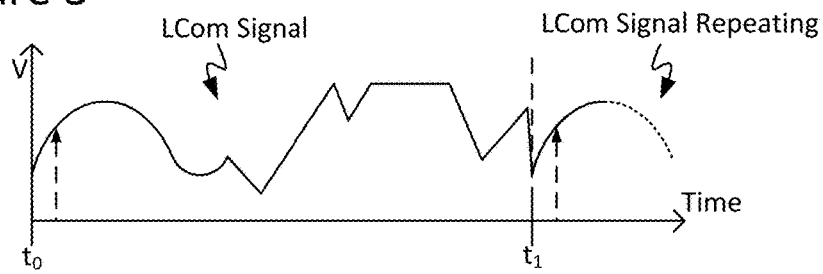
FIG. 3 illustrates an example arbitrary LCom signal as may be transmitted by an LCom-enabled luminaire, in accordance with embodiments of the present disclosure.

As previously noted, a given LCom-enabled luminaire 100 may be configured, in accordance with some embodiments, to output light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured to transmit a given LCom signal over a given time interval $(t_1-t_0)$. In some cases, a given LCom-enabled luminaire 100 may be configured to repeatedly output its one or more LCom signals.

Figure 4:
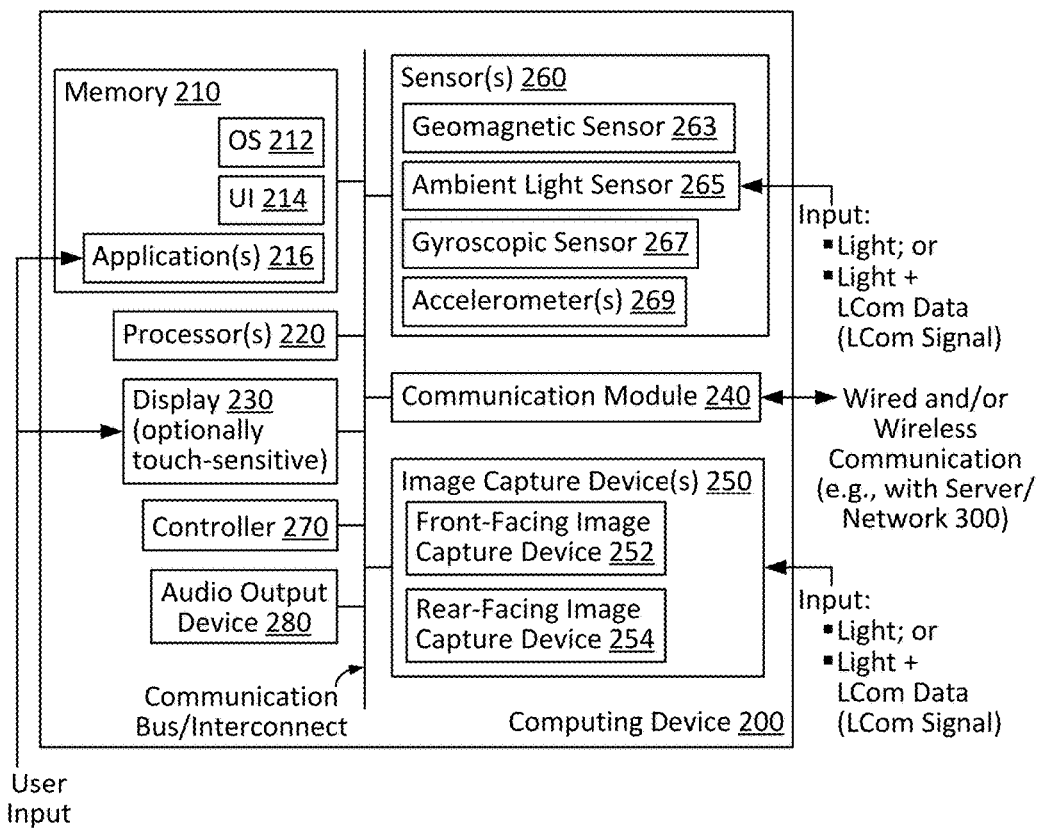
FIG. 4 illustrates an example computing device configured in accordance with embodiments of the present disclosure.

FIG. 4 illustrates an example computing device 200 configured in accordance with an embodiment of the present disclosure. As discussed herein, computing device 200 may be configured, in accordance with some embodiments: (1) to detect the light pulses of an LCom signal; (2) to decode the LCom data from a detected LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be further seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis. The one or more modules stored in memory 210 (e.g., such as OS 212, UI 214, and/or one or more applications 216) can be accessed and executed, for example, by the one or more processors 220 of computing device 200. Just as explained with respect to memory 130 of the luminaires 100, memory 210 of the device 200 may include information that can be used to compute or otherwise calculate an estimated mobile computing device location, as will be appreciated in light of this disclosure.

Operating System (OS) 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure. A user interface (UI) module 214 is provided as commonly done, and generally allows for user interaction with the computing device 200 (e.g., such as a graphical touched-based UI on various smartphones and tablets). Any number of user interface schemes can be used.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). In accordance with some embodiments, a given application 216 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 216 can be instructions encoded on any suitable non-transitory machine-readable medium that, when executed by one or more processors 220, carries out functionality of a given computing device 200, in part or in whole. In one example embodiment, at least one of these applications 216 may be a navigation application configured to receive LCom signals, decode the LCom signals to extract information such as luminaire identifiers and mapping information, and determine the position of the computing device 200 based on the luminaire identifiers and the mapping information. In addition, at least one application 216 may be further configured to also monitor the luminaire for any changes (orientation, with respect to computing device 200). Likewise, in some embodiments, the at least one application 216 may be further configured to optionally try to adjust its own settings to optimize decoding in effort to deal with situations where control by luminaire 100 is not available, for whatever reason.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means. In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given UI action. In some cases, a touch-sensitive display 230 may facilitate user interaction with computing device 200 via the UI 214 presented by such display 230. Numerous suitable configurations for display 230 will be apparent in light of this disclosure.

In accordance with some embodiments, computing device 200 may include a communication module 240, which may be a transceiver or other network interface circuit configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100 via network 300. Numerous suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced. A given image capture device 250 can be any device configured to capture digital images, such as a still camera (e.g., a camera configured to capture still photographs) or a video camera (e.g., a camera configured to capture moving images including a plurality of frames). In some cases, a given image capture device 250 may include typical components such as, for instance, an optics assembly, an image sensor, and/or an image/video encoder, and may be integrated, in part or in whole, with computing device 200. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Numerous other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. As a result of using these inertial sensors, the computing device 200 may provide highly accurate position information. The accuracy of this position information may result in improved navigation system operation, because the luminaire position determined using the information from the multiple data points from the inertial sensors will likely be more accurate than a luminaire position calculated using a single data point. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous sensor configurations for device 200 will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250, and/or to output a control signal to control operation of one or more sensors 260. Numerous other configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Numerous other suitable types and configurations for audio output device 280 will depend on a given application and will be apparent in light of this disclosure.

Network 300 can be any suitable public and/or private communications network. For instance, in some cases, network 300 may be a private local area network (LAN) operatively coupled to a wide area network (WAN), such as the Internet. In some cases, network 300 may include one or more second-generation (2G), third-generation (3G), fourth-generation (4G), and/or fifth-generation (G) mobile communication technologies. In some cases, network 300 may include a wireless local area network (WLAN) (e.g., Wi-Fi wireless data communication technologies). In some instances, network 300 may include Bluetooth wireless data communication technologies. In some cases, network 300 may include supporting infrastructure and/or functionalities, such as a server and a service provider (e.g., computer system 301), but such features are not necessary to carry out communication via network 300. In some instances, computing device 200 may be configured for communicative coupling, for example, with a network 300 and one or more LCom-enabled luminaires 100. In some cases, computing device 200 may be configured to receive data from network 300, for example, which serves to supplement LCom data received by computing device 200 from a given LCom-enabled luminaire 100. In some instances, computing device 200 may be configured to receive data (e.g., such as known reference position information, luminaire position, luminaire identifiers, and/or other data pertaining to a given LCom-enabled luminaire 100) from network 300 that facilitates navigation via one or more LCom-enabled luminaires 100. Numerous configurations for network 300 will be apparent in light of this disclosure.

Figure 5:
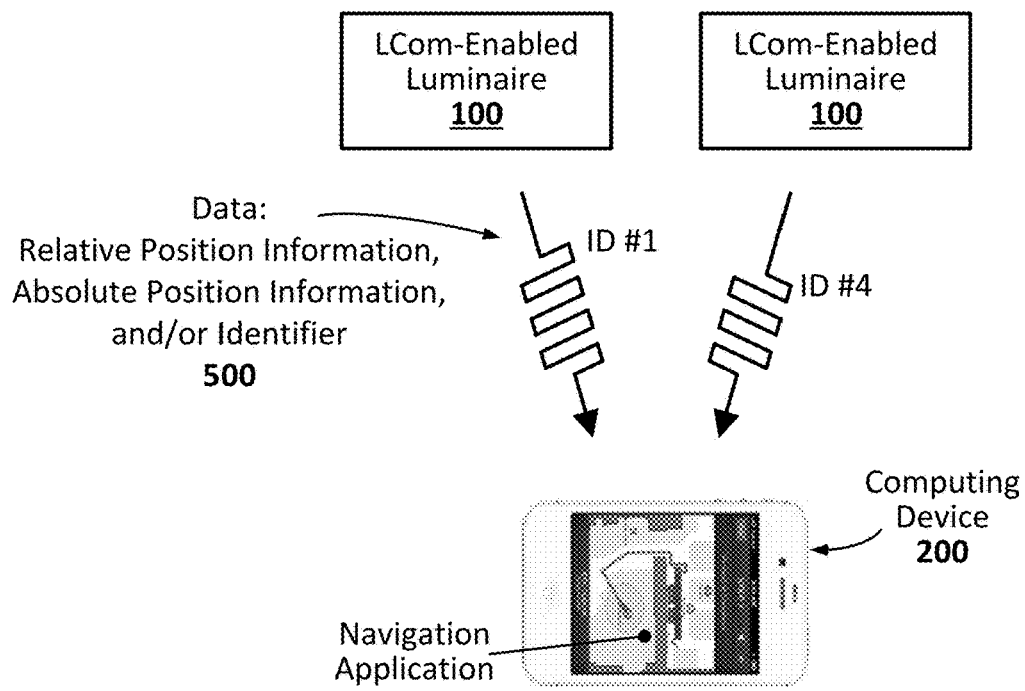
FIG. 5 illustrates an example LCom system, including an LCom-enabled luminaire and a computing device, in accordance with embodiments of the present disclosure.

FIG. 5 illustrates an example LCom system, including an LCom-enabled luminaire and a computing device, in accordance with an embodiment of the present disclosure. As can be seen, this example scenario includes two luminaires 100 each communicating with a computing device 200, which happens to be a smartphone running an LCom-based navigation application. The navigation application can be, for instance, one of the applications 216 stored in memory 210 and executed by processor(s) 220. As can be further seen, the LCom signals being communicated include data 500, which generally includes position information, which may be used to navigate. For instance, if the user is receiving light from a specific luminaire 100 that has a known location, then the navigation application 'knows' where the user is and can continue to guide the user along the targeted path.

The position information 500 transmitted by the luminaires 100 may come in any number of forms. For instance, in some embodiments, the luminaire positions may be communicated as a relative position (e.g., relative to another luminaire 100, or some other object having a known position), and/or as an absolute position (e.g., x-y coordinates of a grid-based map). In still other embodiments, the luminaire position may be communicated as an identifier, in which the transmitted ID translates to a specific location on a given map of the environment being navigated. In some such example cases, for instance, a luminaire might use dual tone multi frequency (DTMF) encoding, which means it continuously sends two unique frequencies. In some embodiments, the luminaire position may be communicated via a fiducial pattern as described herein.

Figure 6:
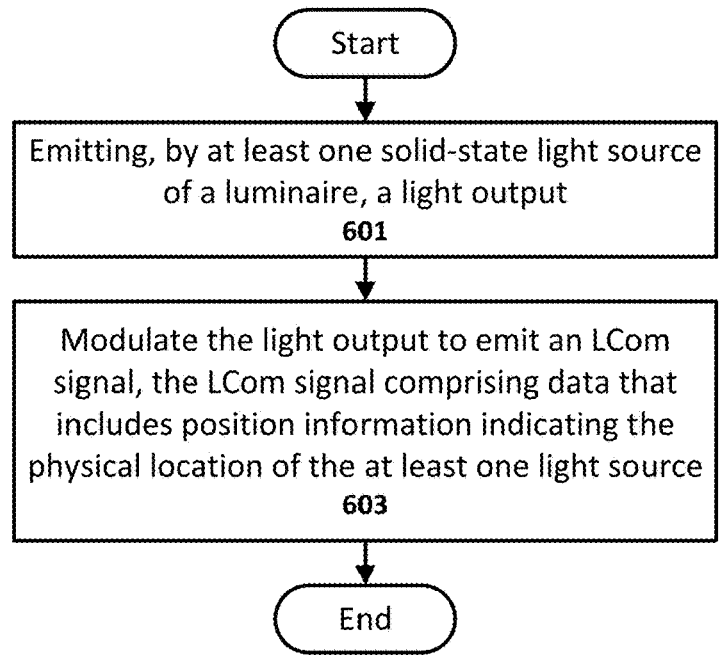
FIG. 6 illustrates an example method for emitting position information from an LCom-enabled luminaire, in accordance with embodiments of the present disclosure.

FIG. 6 illustrates an example method for emitting position information from an LCom-enabled luminaire, in accordance with an embodiment of the present disclosure. As can be seen, the method includes emitting 601, by at least one solid-state light source of a luminaire, a light output. The method further includes modulating 603 the light output to emit an LCom signal, the LCom signal including data that includes position information indicating the physical location of the at least one light source. According to some embodiments, this position information may indicate that particular luminaire's location directly by virtue of relative or absolute position information, as previously explained. In other embodiments, this position information may indicate that particular luminaire's location indirectly by virtue of an identifier that translates to a specific location on a given map of the environment being navigated. In some embodiments, the some luminaires may transmit mapping information while other luminaires may transmit identifiers. A navigation application may use the combination of mapping information and identifiers to determine the location of a computing device. Numerous other embodiments and variations using luminaires having known locations within a given area to be navigated will be apparent in light of this disclosure.

LCom Transmission of Identifiers and Mapping information

Figure 7:
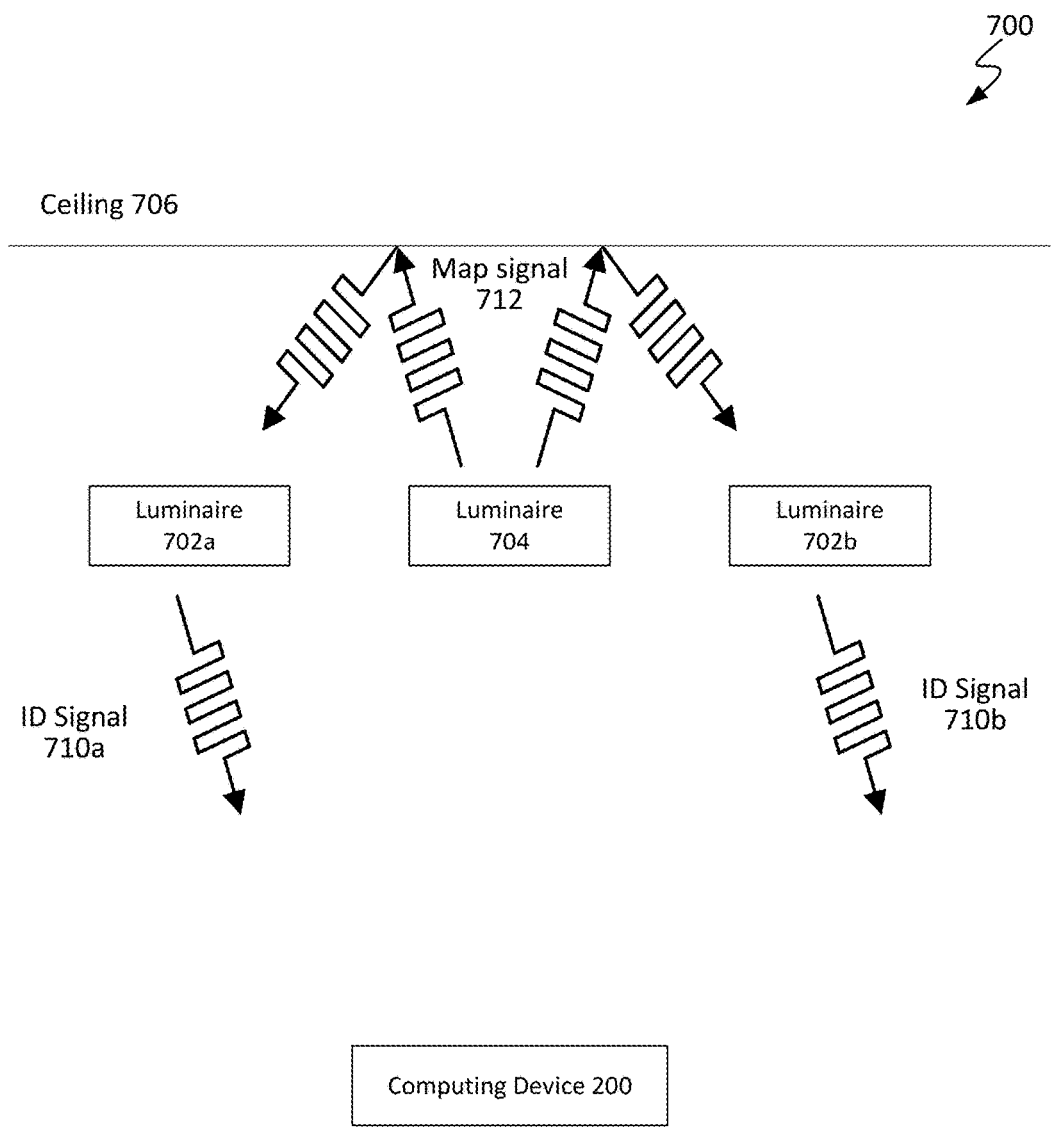
FIG. 7 is a block diagram illustrating an example LCom system that transmits identifier and mapping information in accordance with embodiments of the present disclosure.

FIG. 7 is a block diagram illustrating an example LCom system 700 that transmits both identifiers and mapping information in accordance with embodiments of the present disclosure. The LCom system 700 includes a first plurality of luminaires 702a, 702b (collectively, luminaires 702) and a second plurality of luminaires 704. The first plurality of luminaires 702 and the second plurality of luminaire 702 may be configured to transmit LCom signals. Although FIG. 7 shows two luminaires 702 and one luminaire 704, in general the LCom system 700 may include any number of luminaires 702 and luminaires 704. The LCom system 700 may be located in an indoor environment that includes a ceiling 706.

Each of the first plurality of luminaires 702 may transmit a unique identifier. For example, luminaire 702a may transmit an ID signal 710a and luminaire 702b may transit an ID signal 710b in a downward direction, toward the floor of the indoor environment. In some embodiments, the identifiers may give some information about the location of the luminaire that transmits the identifier. For example, each identifier may contain coordinates of a grid that overlays the indoor environment. Each of the second plurality of luminaires 704 may transmit mapping information in a map signal 712 upward towards the ceiling 712. The map signal 712 and the ID signals 710a, 710b may be LCom signals. The map signal 712 may reflect off the ceiling and be dispersed downward within the indoor environment. Thus the first plurality of luminaires 702 may provide direct downward light while the second plurality of luminaires 704 may provide indirect, ambient light.

In some embodiments, the luminaires 704 may be located in certain areas of the indoor environment. For example, the luminaires 704 may be located near the entrance and in heavily trafficked areas, and those areas may be identified to users as spots that transmit mapping information. In some embodiments, the luminaires 704 may transmit different types of mapping information. For example, a first subset of the luminaires 704 may transmit detailed mapping information at a first data rate while a second first subset of the luminaires 704 may transmit general mapping information at a second, slower data rate. This allows computing devices that are capable of decoding the first, faster data rate to be able to receive detailed mapping information, while computing devices that can only decode the second, slower data rate are still able to still receive mapping information at a general level. In some embodiments, the luminaires 704 may be configured to transmit additional information such as emergency warnings, general broadcasts, and sales alerts. This allows such information to be distributed broadly across the indoor environment without interfering with the navigation transmissions.

A computing device 200, such as a smart phone, may be within the indoor environment. A navigation application executing on the computing device 200 may capture an image of the light emitted by one or more of the first plurality of luminaires 702 and one or more of the second plurality of luminaires 704. The image may be captured by an image capture device (e.g., front-facing image capture device 252 or rear-facing image capture device 254) or a sensor (e.g., ambient light sensor 265) on the computing device.

The first plurality of luminaires 702 may repeatedly transmit the identifiers, while the second plurality of luminaires 704 may repeatedly transmit the mapping information. However, the identifiers are usually 10-16 bits long while the mapping information may be several kilobytes long. Thus the repetition time for the identifiers is shorter than the repetition time for the mapping information. If the computing device 200 misses a portion of an identifier, it can easily capture the missing information in the next repetition. However, if the computing device 200 misses a portion of the mapping information, it would have to wait a long time before that missing information repeats. In some embodiments, the mapping information may be divided into portions of data and the second plurality of luminaires 704 may repeatedly transmit each portion before moving to the next portion. For example, the second plurality of luminaires 704 may transmit each portion of data three times. This built-in redundancy allows the computing device 200 to collect missing information quickly. Other means of data redundancy may also be used, such as error recovery bits. In other embodiments, the data rate for the second plurality of luminaires 704 may be slower than the data rate for the first plurality of luminaires 702. For example, the first plurality of luminaires 702 may transmit data at a rate of 16 bits per frame while the second plurality of luminaires 704 may transmit data at a rate of 4 bits per frame. This allows the computing device 200 to decode the identifiers quickly but be able to receive the mapping information with less error although over a longer span of time.

Figure 8:
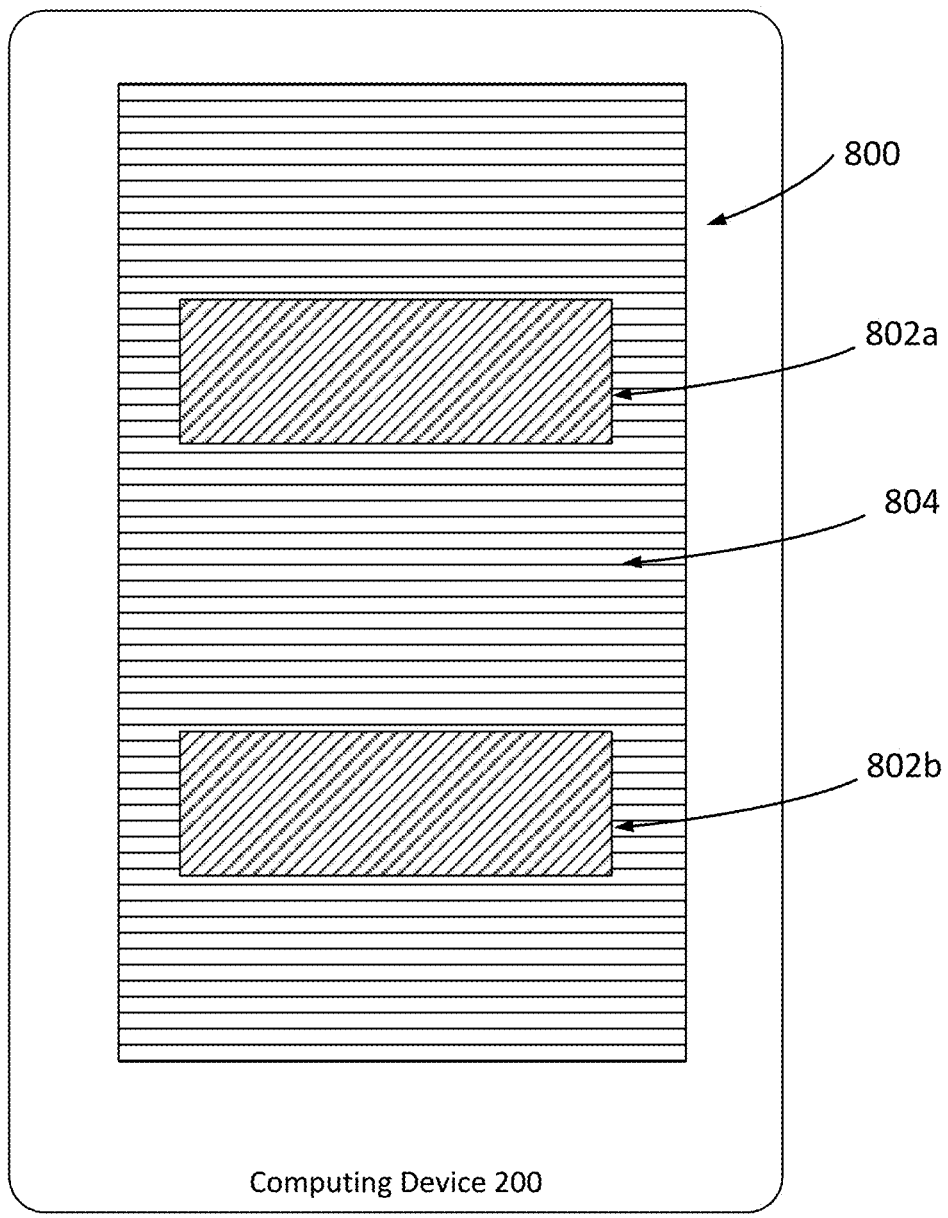
FIG. 8 is a block diagram of a computing device that receives LCom signals encoding identifier and mapping information in accordance with embodiments of the present disclosure.

FIG. 8 illustrates a block diagram of a computing device that receives LCom signals encoding identifier and mapping information in accordance with embodiments of the present disclosure. The display of the computing device 200 shows an image 800 captured by an image capture device and/or a sensor of the computing device 200. The image 800 may include image portions 802a, 802b that correspond to brighter, discrete light sources. For example, the image portions 802a, 802b may correspond to the light emitted by the luminaires 702a, 702b respectively, in FIG. 7. The image 800 may also include image portion 804 that corresponds to duller, ambient light sources. For example, the image portion 804 may correspond to the light emitted by the second plurality of luminaires 704 in FIG. 7. The image portions 802a, 802b may appear brighter than the image portion 804 because the luminaires 702a, 704 are pointed downward towards the computing device 200 while the second plurality of luminaires 704 are pointed upwards and the computing device 200 receives light that has reflected off the ceiling.

In some embodiments, the navigation application and/or computing device may vary the shutter speed of the raster lines in the image capture device or sensor that is capturing the image. As the image portions 802a, 802b appear brighter than the image portion 804, the shutter speed for the raster lines that include the image portions 802a, 802b may be short to prevent overexposure. Meanwhile, the shutter speed for the raster lines that do not include the image portions 802a, 802b may be longer to prevent underexposure. In some embodiments, the navigation application and/or computing device may be capable of varying the shutter speed at the sub-raster level (e.g., at the pixel level). Thus the pixels that capture the image portions 802a, 802b may have a shorter shutter speed than the pixels that capture the image portion 804.

In some embodiments, the computing device 200 may use more than one device or sensor to capture the image. For example, one image capture device or sensor (e.g., a camera) may capture an image at a particular frame rate in order to accurately decode the identifier LCom signals from the luminaires 702a, 702b, while a separate image capture device or sensor (e.g., an ambient light sensor) may capture another image at a different frame rate in order to accurately decode the map identifier LCom signal from the luminaires 704. Certain devices or sensors on the computing device 200 may be able to handle faster frame rates than general CMOS cameras, so the mapping information may be transmitted at faster frame rates and still be adequately captured by the computing device 200. In another example, a first separate image capture device or sensor may be pointed upward and capture identifier LCom signals while a second separate image capture device or sensor may be pointed downward and capture mapping information LCom signals from ambient light reflected from the floor.

Because the image 800 includes light from different sources, each encoding different information, the navigation application first isolates certain portions of the image for further analysis. The navigation application may define boundaries between the image portions 802a, 802b, and 804 based on the brightness in the image 800. This may be done using any known image processing techniques. The boundaries may signify that the majority of light within each boundary comes from a particular light source. For example, the navigation application may determine that the light in image portion 802a may be attributed to a first light source, the light in image portion 802b may be attributed to a second light source, and the light in image portion 804 may be attributed to a third light source.

The navigation application may decode LCom signals from one or more of the image portions. The navigation application may be configured to recognize that brighter image portions correspond to downward-facing luminaires that transmit identifiers while duller image portions correspond to upward-facing luminaires that transmit mapping information. The navigation application may be configured to decode the LCom signals from brighter image portions first. For example, the navigation application may decode the LCom signal within the image portion 802a to obtain the identifier of the luminaire corresponding to the image portion 802a (e.g., ID signal 710a). Likewise, the navigation application may decode the LCom signal within the image portion 802b to obtain the identifier of the luminaire corresponding to the image portion 802b (e.g., ID signal 710b).

The navigation application may then subtract the decoded LCom signals from the rest of the image to obtain the LCom signal embedded in the ambient light. This may increase the signal to noise ratio when decoding the LCom signal embedded in the ambient light. For example, for each raster line in the image 800, the navigation application may subtract the LCom signals in image portions 802a, 802b from the rest of the raster line so that the ambient light in image portion 804 may be analyzed without interference from the light from the image portions 802a, 802b. The navigation application may then decode the LCom signal in the image portion 804 to obtain the mapping information transmitted by the second plurality of luminaires 704.

The navigation application may utilize the decoded identifiers and mapping information to determine the location of the computing device 200 within the indoor environment. The mapping information may include associations between the identifiers of the luminaires 702a, 702b and their respective locations within the indoor environment. Using the identifiers, the navigation application may determine the location in the indoor environment at which the computing device 200 would be able to capture light from both luminaires 702a, 70b. The navigation application may also utilize other information to help determine the location of the computing device 200, such as GPS information or sensor data from gyroscopes or accelerometers.

Figure 9:
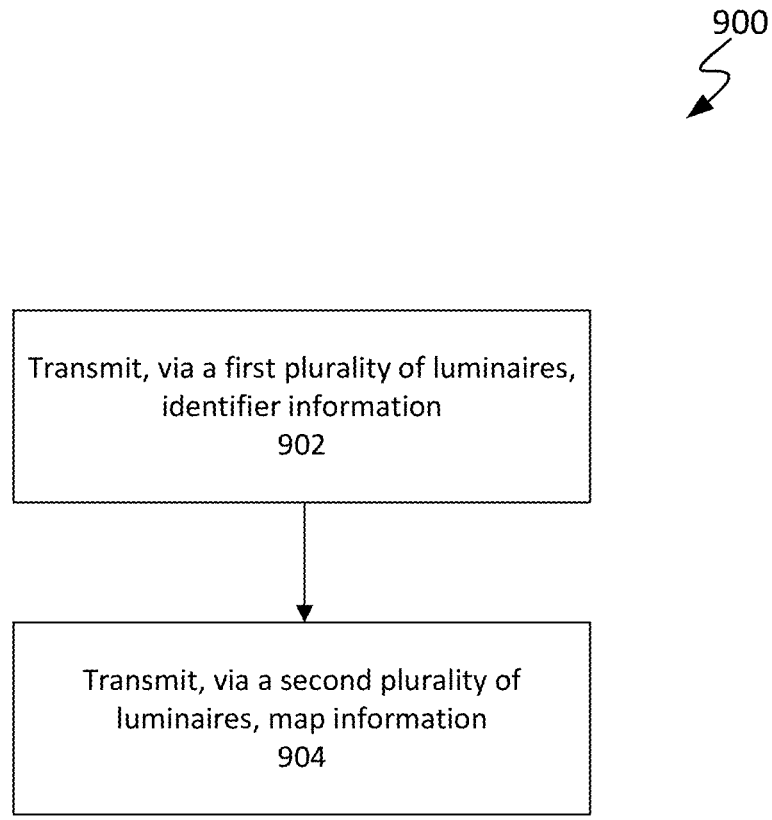
FIG. 9 illustrates a method of providing indoor navigation services in accordance with embodiments of the present disclosure.

FIG. 9 illustrates a method 900 of providing indoor navigation services in accordance with an embodiment of the present disclosure. The method 900 may be performed by a plurality of luminaires (e.g., luminaires 100) that are configured to communicate information via LCom signals. The luminaires may or may not be controlled by a central controller, such as a server communicatively coupled to each luminaire. The plurality of luminaires may be located in an indoor environment.

In block 902, a first plurality of luminaires may transmit identifiers via LCom signals. Each of the first plurality of luminaires may be assigned a unique identifier, and each luminaire may transmit that identifier via an LCom signal. The first plurality of luminaires may be configured to emit light downwards towards the ground of the indoor environment. Thus the first plurality of luminaires may provide a direct downward light to people and computing devices in the indoor environment. A computing device may capture the LCom signals emitted by the first plurality of luminaires using an image capture device and/or a sensor.

In block 904, a second plurality of luminaires may transmit mapping information via LCom signals. The mapping information may associate the identifiers of the first plurality of luminaires with their location in the indoor environment. The second plurality of luminaires may be configured to emit light upwards towards the ceiling of the indoor environment. The light reflects off the ceiling and back downward, creating indirect ambient lighting for the indoor environment. In some embodiments, the second plurality of luminaires may transmit the mapping information at a slower data rate than the first plurality of luminaires. In some embodiments, the mapping information may be divided into portions of data. The second plurality of luminaires may transmit each portion of data a repeated number of times before moving to the next portion. This provides redundancy in case a computing device misses a portion of data. In some embodiments, one subset of the second plurality of luminaires may transmit general mapping information while another subset of the second plurality of luminaires may transmit detailed mapping information. The detailed mapping information may be transmitted at a faster data rate than the general mapping information. This allows computing devices capable of capturing the faster data rate to receive more detailed information while allowing other computing devices to still receive basic mapping information.

A computing device may capture the LCom signals emitted by the second plurality of luminaires using an image capture device and/or a sensor. The computing device may decode the identifiers and mapping information and use them to determine the location of the computing device in the indoor environment, as further described with reference to FIG. 10. In this manner, the method 900 provides a way of completely transmitting information for indoor positioning using LCom signals.

Figure 10:
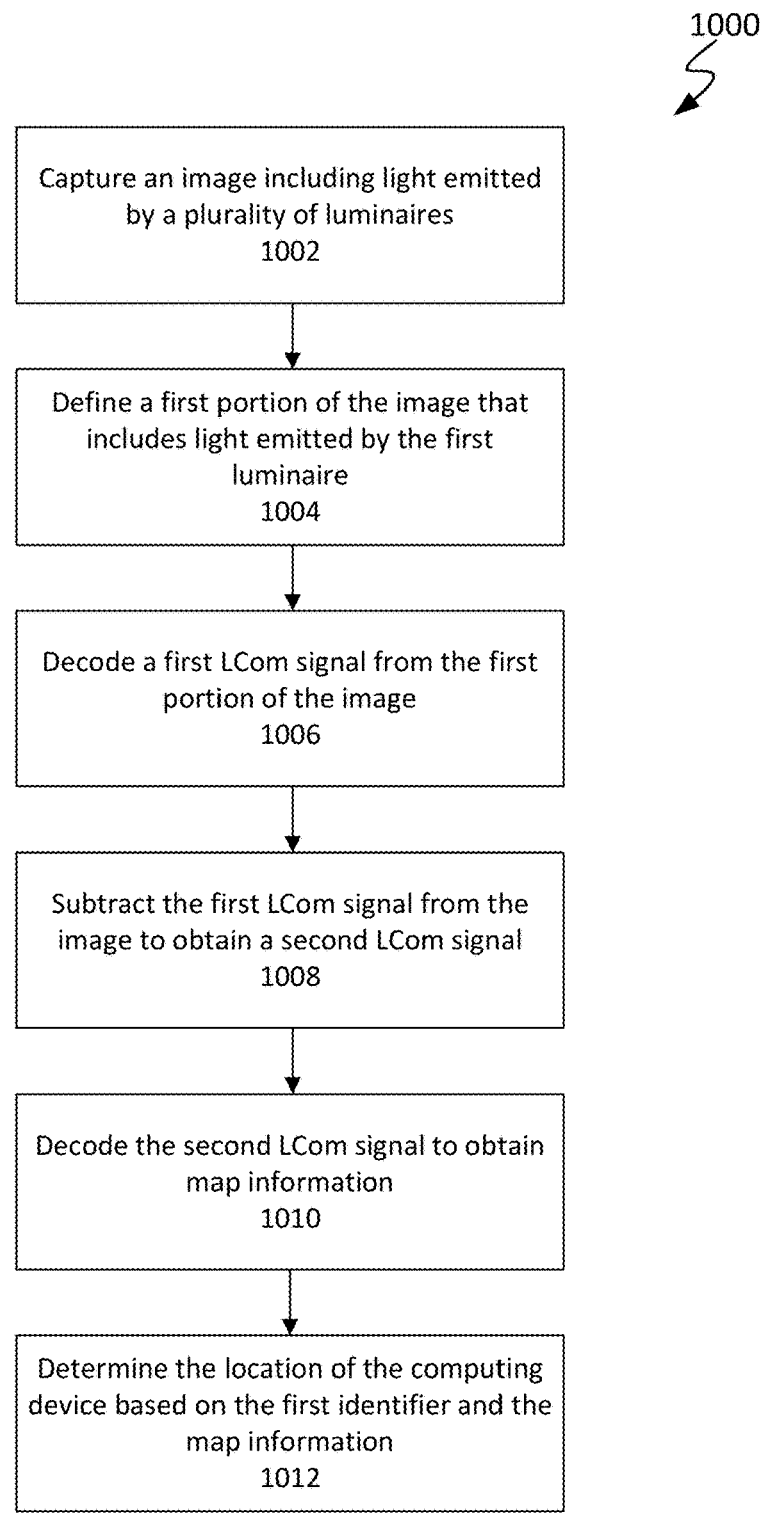
FIG. 10 illustrates a method of receiving indoor navigation services in accordance with embodiments of the present disclosure.

FIG. 10 illustrates a method 1000 of receiving indoor navigation services in accordance with an embodiment of the present disclosure. The method 1000 may be performed by a computing device (e.g., computing device 200) that is configured to receive LCom signals transmitted by a plurality of luminaires. The computing device and the plurality of luminaires may be located in an indoor environment. A navigation application executing on the computing device may provide indoor navigation services to a user of the computing device.

In block 1002, the computing device may capture an image including light emitted by a plurality of luminaires. A first luminaire in the plurality of luminaires may transmit a first identifier encoded in a first light-based communication (LCom) signal and a second luminaire in the plurality of luminaires may transmit mapping information encoded in a second LCom signal. The mapping information may associate the first identifier with a location of the first luminaire. The computing device may use one or more image capture devices (e.g., cameras) or sensors (e.g., ambient light sensors) to capture the image. The first luminaire may emit light downward directly toward the computing device while the second luminaire may emit light upward towards the ceiling, where it is reflected back downward to provide ambient lighting. For simplicity of explanation, only two luminaires are described, but in general the image may include light emitted by any number of luminaires, each of which may be transmitting identifiers or mapping information.

In block 1004, the computing device may define a first portion of the image that includes light emitted by the first luminaire. The computing device may use any known image processing techniques to define boundaries in the image, the boundaries signifying that the majority of light within each boundary comes from a particular light source. For example, the majority of the light in the first portion of the image is emitted by the first luminaire and thus includes the first LCom signal.

In block 1006, the computing device may decode the first LCom signal from the first portion of the image to obtain the first identifier. The computing device may use any known LCom signal processing techniques to decode the first LCom signal.

In block 1008, the computing device may subtract the first LCom signal from the image to obtain the second LCom signal. By subtracting the light from the first LCom signal from the image, the majority of the remaining light is emitted by the second luminaire and thus includes the second LCom signal. This subtraction may increase the signal to noise ratio when decoding the second LCom signal. In block 1010, the computing device may decode the second LCom signal to obtain the mapping information. The computing device may use any known LCom signal processing techniques to decode the second LCom signal.

In block 1012, the computing device may determine the location of the computing device based on the first identifier and the mapping information. For example, the computing device may determine that the computing device is in proximity to the first luminaire. The computing device may also utilize other information to help determine the location of the computing device, such as GPS information or sensor data from gyroscopes or accelerometers. In this manner, the method 1000 provides a way of receiving information for indoor positioning completely from LCom signals.

Further Considerations

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A method of receiving indoor navigation services, comprising:
    capturing, at a computing device, an image comprising light emitted by a plurality of luminaires, wherein a first luminaire in the plurality of luminaires transmits a first identifier encoded in a first light-based communication (LCom) signal and a second luminaire in the plurality of luminaires transmits mapping information encoded in a second LCom signal, the mapping information associating the first identifier with a location of the first luminaire;
    defining, by the computing device, a first portion of the image that includes light emitted by first luminaire;
    decoding, by the computing device, the first LCom signal from the first portion of the image to obtain the first identifier;
    subtracting, by the computing device, for each raster line in the image, light from the first LCom signal to obtain light from the second LCom signal;
    decoding, by the computing device, the second LCom signal to obtain the mapping information; and
    determining, by the computing device, a location of the computing device based on the first identifier and the mapping information.

2. The method of claim 1, wherein the first luminaire transmits the first identifier at a first data rate and the second luminaire transmits the mapping information at a second data rate slower than the first data rate.

3. The method of claim 1, wherein the image comprises light emitted directly from the first luminaire and light emitted by the second luminaire and reflected from a surface.

4. The method of claim 1, wherein the image further comprises light emitted by a third luminaire in the plurality of luminaires that transmits a third identifier encoded in a third LCom signal, the method further comprising:
    defining, by the computing device, a second portion of the image that includes light emitted by third luminaire;
    decoding, by the computing device, the third LCom signal from the second portion of the image to obtain the third identifier;
    subtracting, by the computing device, for each raster line in the image, light from the first LCom signal and the third LCom signal to obtain the second LCom signal; and
    determining, by the computing device, the location of the computing device based on the first identifier, the third identifier, and the mapping information.

5. An indoor navigation system, comprising:
    a first plurality of luminaires, wherein each of the first plurality of luminaires is configured to transmit an associated identifier via light-based communication (LCom) signals;
    a second plurality of luminaires, wherein each of the second plurality of luminaires is configured to transmit mapping information via LCom signals, the mapping information associating the identifiers of each of the first plurality of luminaires with a location of each of the first plurality of luminaires; and
    a computing device configured to determine a location of the computing device by:
        capturing an image comprising a first LCom signal emitted by a first luminaire in the first plurality of luminaires and a second LCom signal emitted by a second luminaire in the second plurality of luminaires;
        defining a first portion of the image that includes light emitted by first luminaire;
        decoding the first LCom signal from the first portion of the image to obtain a first identifier of the first luminaire;
        subtracting, for each raster line in the image, light from the first LCom signal to obtain the second LCom signal;
        decoding the second LCom signal to obtain the mapping information; and
        determining, by the computing device, a location of the computing device based on the first identifier and the mapping information.

6. The system of claim 5, wherein the first plurality of luminaires transmits the identifiers at a first data rate and the second plurality of luminaires transmits the mapping information at a second data rate slower than the first data rate.

7. The system of claim 5, wherein:
    the first plurality of luminaires transmits the LCom signals towards the ground of an indoor environment; and
    the second plurality of luminaires transmits the LCom signals towards the ceiling of the indoor environment.

8. The system of claim 7, wherein the computing device directly receives the LCom signals from the first plurality of luminaires, and indirectly receives the LCom signals from the second plurality of luminaires via reflection from the ceiling of the indoor environment.

9. The system of claim 5, wherein the computing device receives the LCom signals transmitted by the first plurality of luminaires via a first image capture device or sensor, and receives the LCom signals transmitted by the second plurality of luminaires via a second image capture device or sensor.

10. The system of claim 5, wherein a first subset of the second plurality of luminaires transmits general mapping information and a second subset of the second plurality of luminaires transmits detailed mapping information.

11. The system of claim 5, wherein the mapping information is divided into a plurality of portions of mapping information and the second plurality of luminaires is configured to transmit each of the plurality of portions of mapping information a predetermined number of times.

* * * * *